(12) United States Patent
Zimmermann et al.

(10) Patent No.: US 6,910,079 B2
(45) Date of Patent: Jun. 21, 2005

(54) MULTI-THRESHOLD SMOOTHING

(75) Inventors: Roger Zimmermann, Walnut, CA (US); Cyrus Shahabi, Irvine, CA (US); Kun Fu, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 165 days.

(21) Appl. No.: 10/351,462

(22) Filed: Jan. 24, 2003

(65) Prior Publication Data

US 2003/0165150 A1 Sep. 4, 2003

Related U.S. Application Data

(60) Provisional application No. 60/352,071, filed on Jan. 25, 2002.

(51) Int. Cl.[7] ........................... G06F 15/173; G06F 5/06
(52) U.S. Cl. ....................... 709/233; 709/232; 709/234; 709/235; 710/52; 710/60
(58) Field of Search ................................. 709/233, 234, 709/235; 370/412, 413; 710/52, 60

(56) References Cited

PUBLICATIONS

Klara Nahrstedt, "End-to-End QoS Guarantees in Networked Multimedia Systems", ACM Computing Surveys, vol. 27, No. 4, Dec. 1995.

Srinivas Ramanathan et al., "Adaptive Feedback Techniques for Synchronized Multimedia Retrieval over Integrated Networks", IEEE/ACM Transactions of Networking, vol. 1, No. 2 Apr. 1993.

Pratap S. Khedkar et al., "Fuzzy Prediction of Timeseries", IEEE 1992.

Joseph Y. Hui et al., "Quality–of–Service Control in GRAMS for ATM Local Area Network" IEEE Journal of Selected Areas in Communications, vol. 13, No. 4, May 1995.

Klara Nahrstedt et al., "New Algorithms for Admission Control and Scheduling to Support Multimedia Feedback Remote Control Applications", IEEE Proceedings of Multimedia 1996.

Markus Mielke at al., "A Multi–level Buffering and Feedback Scheme for Distributed Multimedia Presentation Systems", IEEE 1998.

Ray–I Chang et al., "An Effective and Efficient Traffic Smoothing Scheme for Delivery of Online VBR Media Streams", IEEE 1999.

Jaber A. Al–Marri et al., An Evaluation of Alternative Disk Scheduling Techniques in Support of Variable Bit Rate Continuous Media, University of Southern California.

Van Jacobson et al., "Congestion Avoidance and Control", Nov. 1988.

(Continued)

*Primary Examiner*—Jack A. Lane
(74) *Attorney, Agent, or Firm*—Fish & Richardson P.C.

(57) ABSTRACT

Systems and techniques are provided for using a multi-threshold buffer model to smooth data transmission to a client. A client to receive data such as streaming media data may include a buffer. A server to transmit data to the client may transmit the data to the client at a first server transmission rate. The client buffer level may be determined at different times; for example, a first buffer level may be determined at a first time and a second buffer level may be determined at a second time. If the buffer level is at a threshold level or has passed a threshold level between the first and second times, server transmission rate information may be determined and may be sent to the server.

20 Claims, 9 Drawing Sheets

OTHER PUBLICATIONS

Roger Zimmermann et al., "Yima: Design and Evaluation of a Streaming Media System for Residential Broadband Services", Integrated Media Systems Center.

Mark Allman et al., "On Estimating End–to–End Network Path Properties", ACM SIGCOMM 1999.

Cyrus Shahabi et al., "Yima: A Second–Generation Continuous Media Server", IEEE 2002.

Phil Karn et al., "Improving Round–Trip Time Estimates in Reliable Transport Protocols", Computer Communication Review, ACM SIGCOMM, pp. 67–74.

Srinivas Ramanathan et al., "Feedback Techniques for Intra–Media Continuity and Inter–Media Synchronization in Distributed Multimedia Systems", The Computer Journal, Special Issue on Distributed Multimedia Systems, Mar. 1993.

James D. Salehi et al., Supporting Stored Video Reducing Rate Variability and End–to–End Resource Requirements through Optimal Smoothing.

Zhi–Li Zhang et al., "Smoothing, Statistical Multiplexing and Call Admission Control for Stored Video", UMASS CMPSCI Technical Report UM–CS–96–29.

Joseph Y. Hui et al., "Client–Server Synchronization and Buffering for Variable Rate Multimedia Retrievals", IEEE Journal of Selected Areas in Communications, vol. 14, No. 1, Jan. 1996.

Morikawa et al., "A Feedback Rate Control of Video Stream in Best–Effort High–Speed Mobile Packet Network", IEEE, 2002.

MULTI-THRESHOLD SMOOTHING

CROSS-REFERENCE TO RELATED APPLICATIONS

The present application claims priority to co-assigned U.S. Provisional Patent Application No. 60/352,071, entitled "A MULTI-THRESHOLD ONLINE SMOOTHING TECHNIQUE FOR VARIABLE RATE MULTIMEDIA STREAMS," filed on Jan. 25, 2002, which is hereby incorporated by reference in its entirety.

STATEMENT AS TO FEDERALLY SPONSORED RESEARCH

The invention described herein was made in the performance of work funded in part by NSF grants EEC-9529152 (IMSC ERC) and IIS-0082826, and is subject to the provisions of Public Law 96-517 (35 U.S.C. 202) in which the contractor has elected to retain title.

BACKGROUND

Many multimedia applications, such as news-on-demand, distance learning, and corporate training, rely on the efficient transfer of pre-recorded or live multimedia streams between a server computer and a client computer. These media streams may be captured and displayed at a predetermined rate. For example, video streams may require a rate of 24, 29.97, 30, or 60 frames per second. Audio streams may require 44,100 or 48,000 samples per second. An important measure of quality for such multimedia communications is the precisely timed playback of the streams at the client location.

Achieving this precise playback is complicated by the popular use of variable bit rate (VBR) media stream compression. VBR encoding algorithms allocate more bits per time to complex parts of a stream and fewer bits to simple parts, in order to keep the visual and aural quality reasonably uniform. For example, an action sequence in a movie may require more bits per second than the credits that are displayed at the end.

VBR compression may result in bursty network traffic and uneven resource utilization when streaming media. Additionally, due to the different transmission rates that may occur over the length of a media stream, transmission control techniques may need to be implemented so that a client buffer neither underflows or overflows. Transmission control schemes generally fall within one of two categories: they may be server-controlled or client-controlled.

Server-controlled techniques generally pre-compute a transmission schedule for a media stream based on a substantial knowledge of its rate requirements. The variability in the stream bandwidth is smoothed by computing a transmission schedule that has a number of constant-rate segments. The segment lengths are calculated such that neither a client buffer overflow nor an underflow will occur.

Server-controlled algorithms may use one or more optimization criteria. For example, the algorithm may minimize the number of rate changes in the transmission schedule, may minimize the utilization of the client buffer, may minimize the peak rate, or may minimize the number of on-off segments in an on-off transmission model. The algorithm may require that complete or partial traffic statistics be known a-priori.

Client-controlled algorithms may be used rather than server-controlled algorithms. In a client-controlled algorithm, the client provides the server with feedback, instructing the server to increase or decrease its transmission rate in order to avoid buffer overflow or starvation.

SUMMARY

Systems and techniques are provided for using a multi-threshold buffer model to smooth data transmission to a client.

In general, in one aspect, a method includes receiving data such as streaming media data from a server transmitting the data at a first transmission rate. At least some of the received data is stored in a buffer. The buffer level is determined at different times. For example, a first buffer level is determined at a time, and a second buffer level is determined at a later time. The different buffer levels are compared to a plurality of buffer thresholds. For example, the first buffer level and the second buffer level are compared to the buffer thresholds to determine if one or more of the buffer thresholds is in the range between the first buffer level and the second buffer level (where the range includes the first buffer level and the second buffer level).

If at least one threshold is in the range, a second server transmission rate may be determined, based on the at least one threshold. The second server transmission rate may be predetermined (e.g., may be chosen from a list), or may be calculated.

Information based on the second server transmission rate may be transmitted to the server. For example, the second server transmission rate may be transmitted, or a change in server transmission rate may be transmitted. If the second server transmission rate is not different than the first transmission rate, rate information may or may not be transmitted to the server.

The second server transmission rate may be based on a difference between a buffer level and a target buffer level. Different methods may be used to determine second server transmission rates, depending on which threshold is in the range from the first buffer level to the second buffer level. For example, a first calculation method may be used to determine the second server transmission rate if a particular threshold is in the range, while a second calculation method may be used if a different threshold is in the range. Alternately, the second server rate may be calculated for a particular threshold, and may be chosen for a different threshold.

The second server transmission rate may be based on one or more predicted future consumption rates. Future consumption rates may be predicted using one or more past consumption rates. Future consumption rates may be predicted using a prediction algorithm. For example, an average consumption rate algorithm, an exponential average consumption rate algorithm, or a fuzzy exponential average algorithm may be used. One or more weighting factors may be used in the prediction algorithm.

In general, in one aspect, a method for transmitting data such as continuous media data includes transmitting data at a first transmission rate, receiving a communication from a client including rate change information, and transmitting additional continuous media data at a second transmission rate based on the rate change information. The rate change information may be determined using a plurality of buffer threshold levels.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

As explained above, server-controlled or client-controlled algorithms may be used for transmission control of streaming continuous media data. Server-controlled techniques may have several disadvantages. For example, they may not work with live streams where only a limited rate history is available. Additionally, they may not adjust to changing network conditions, and they may get disrupted when users invoke interactive commands such as pause, rewind, and fast forward.

Client-controlled algorithms may be a better choice in a dynamic environment. A client-controlled technique may more easily adapt to changing network conditions. In addition, a simpler and more flexible architecture may be used, since the server does not need to be aware of the content format of the stream. Therefore, new media types such as "haptic" data can automatically be supported without modification of the server software.

However, available client-controlled techniques have a number of drawbacks, including feedback overhead and response delays. Available techniques may not adapt sufficiently quickly to avoid buffer starvation or overflow.

The present application is directed to systems and techniques for providing continuous media data to end users effectively. Using multi-threshold flow control (MTFC), the current systems and techniques may avoid buffer overflow or starvation, even when used in a bursty environment such as a VBR environment. Unlike some available techniques, a-priori knowledge of the actual bit rate for the media stream is not necessary.

Figure 1:
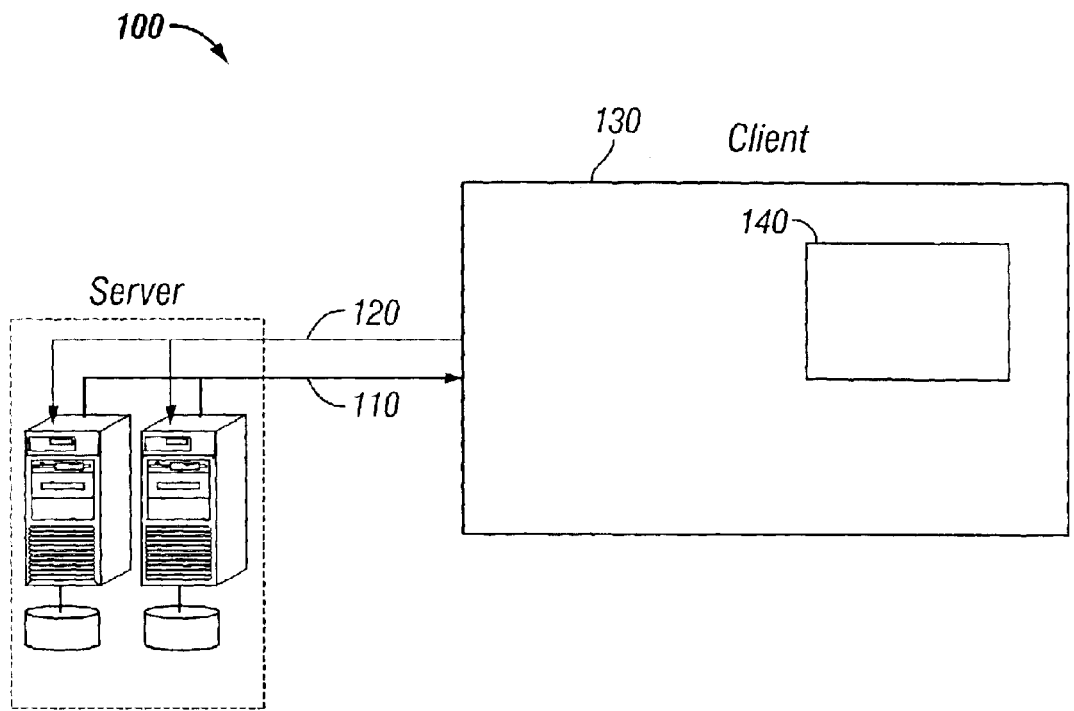
FIG. 1 is a schematic of a system for implementing multi-threshold smoothing.

The current systems and techniques may be implemented in LAN, WAN, or other network environments, with a range of buffer sizes and prediction windows. Referring to FIG. 1, a system 100 includes a server 110, a network 120, and a client 130. For a continuous media system that may be used, please see the pending U.S. patent application Ser. No. 10/351,461 entitled "CONTINUOUS MEDIA SYSTEM," filed Jan. 24, 2003, which is hereby incorporated by reference in its entirety. For information on a data placement technique that may be used with the current systems and techniques, please see the pending U.S. Patent Application Ser. No. 10/351,269 entitled "PSEUDORANDOM DATA STORAGE," filed Jan. 24, 2003, which is hereby incorporated by reference in its entirety.

Client 130 includes a client buffer 140, with a capacity equal to B. Client buffer 140 may be used to store data prior to decoding and display/playback. For example, when client 130 is receiving streaming video data from server 110, buffer 140 stores data to be subsequently decoded by a media decoder and displayed to the user. If buffer 140 overflows, some of the data may be lost, and there may be a "hiccup" in the display. Similarly, if buffer 140 empties (i.e. "starves,") there may be a hiccup in the display until additional data is received. Therefore, managing the buffer level is important to providing a high quality display or playback to an end user.

Client 130 (and/or associated machines) also includes circuitry and/or software for implementing multi-threshold flow control. For example, client 130 can receive streaming media data from the server (i.e., client 130 has a network connection), can store at least some of the data in buffer 140 prior to decoding using a decoder (e.g., implemented in hardware and/or software), can determine the buffer level at different times, and can determine whether one or more thresholds has been passed since a previous determination of a buffer level. Client 130 also includes circuitry and/or software to implement a prediction algorithm, and to determine a new server sending rate and/or rate change, and to transmit the server transmission information to server 110.

Similarly, server 110 (and/or one or more associated machines) includes circuits and/or software for transmitting continuous media data to one or more clients, for receiving communications from the one or more clients, and for updating a server transmission rate based on transmission information contained in a communication from the one or more clients.

Buffer Model

Figure 2:
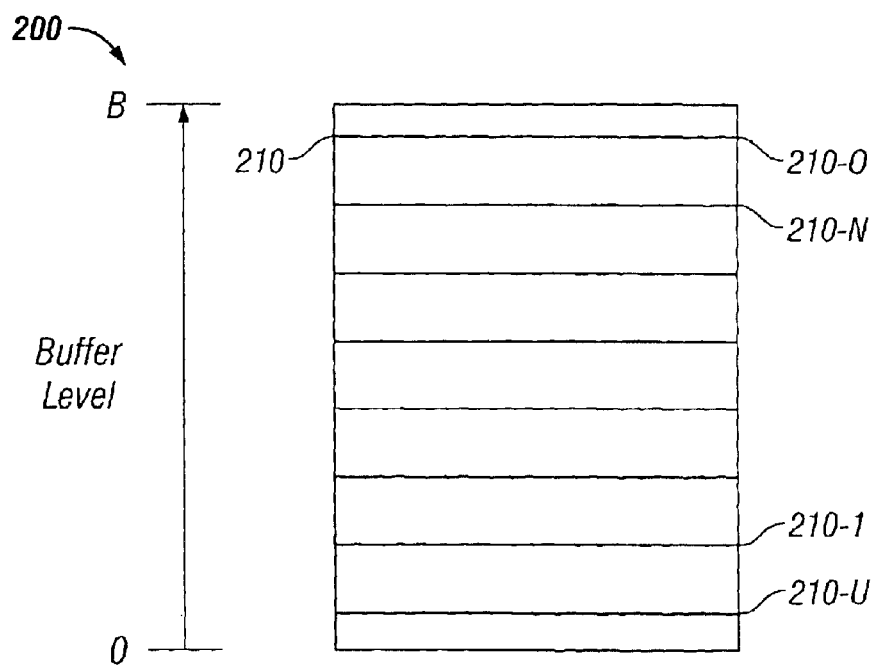
FIG. 2 is a schematic of a buffer model including multiple thresholds.

Referring to FIG. 2, a model 200 of buffer includes a number of watermarks 210. Watermarks 210 include an underflow protection watermark 210-U and an overflow protection watermark 210-O. Watermarks 210 include one or more intermediate watermarks $W_i$ such as watermarks 210-1 to 210-N of FIG. 2.

Watermark 210-U is set at an underflow threshold protection level; that is, a percentage of the buffer capacity that indicates that buffer starvation may be imminent. Watermark 210-1 marks a low buffer warning threshold. When the buffer level falls below watermark 210-1, the buffer is nearing starvation.

Similarly, watermark 210-O is set at an overflow threshold protection level; that is, a percentage of the buffer capacity that indicates that buffer overflow may be imminent. The overflow threshold protection level may be the same as or different than the underflow threshold protection level. Watermark 210-N is the overflow buffer warning threshold.

Figure 3A:
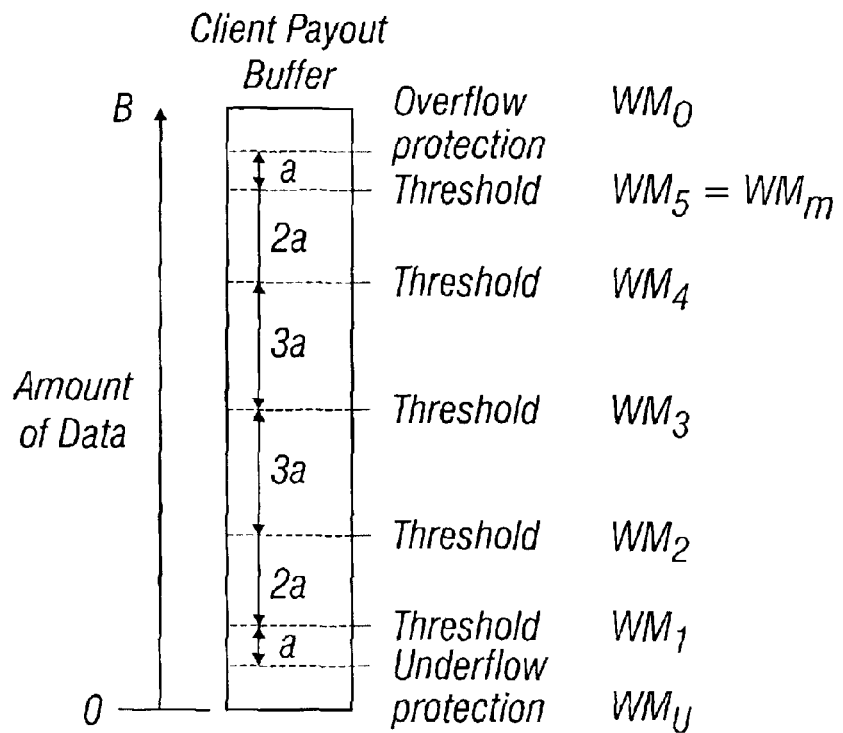
FIG. 3A illustrates arithmetic threshold spacing.
Figure 3B:
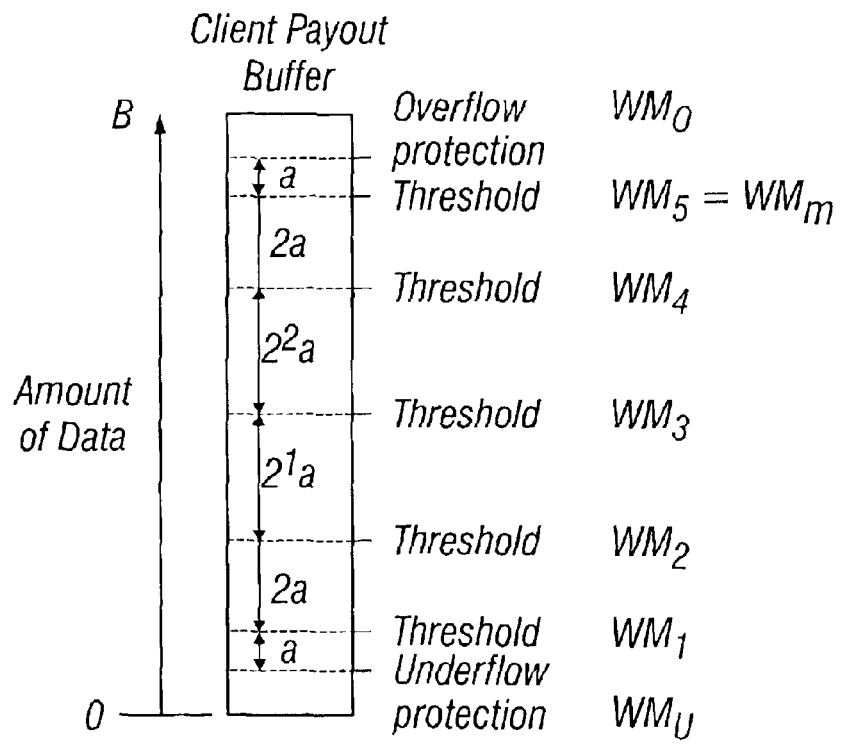
FIG. 3B illustrates geometric threshold spacing.

Using a model such as buffer model 200 may allow smooth streaming of media data from the server to the client. The number of intermediate watermarks N may be varied to provide greater control over the buffer level (larger N) or to provide less control with fewer rate adjustments (smaller N). The watermark spacing may be equidistant, based on an arithmetic series (see FIG. 3A), based on a geometric series (see FIG. 3B), or may be set using a different method.

Figure 3C:
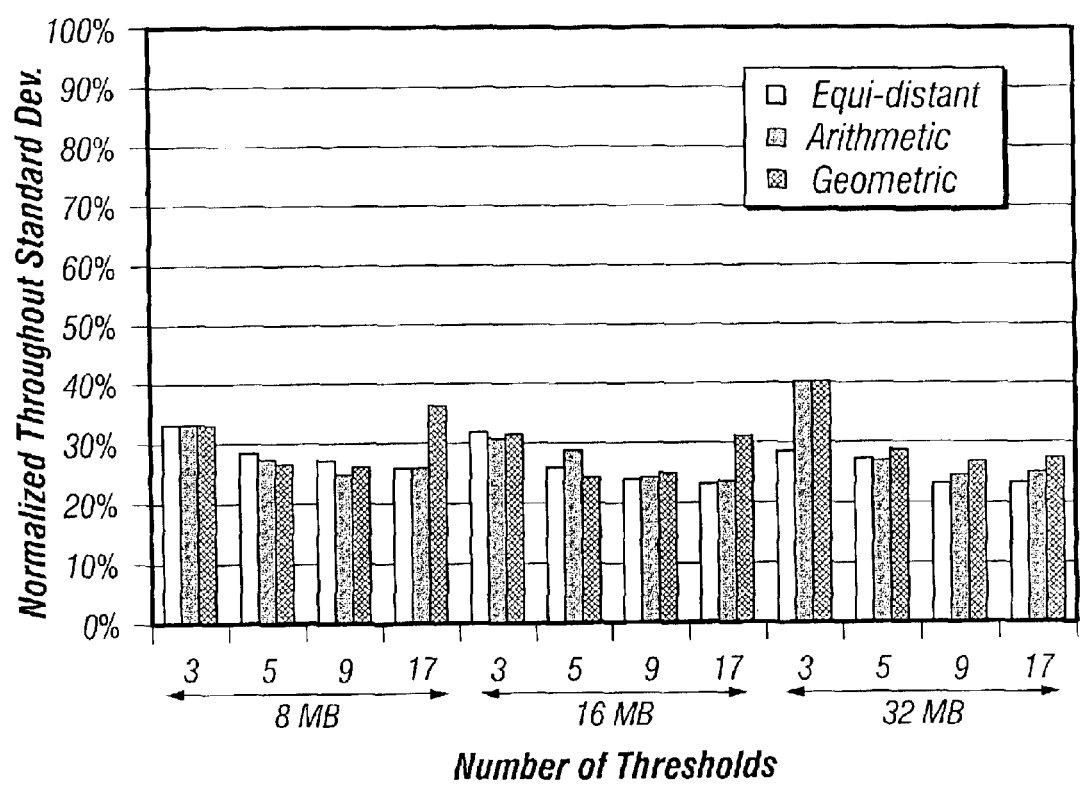
FIG. 3C shows the normalized throughput using three threshold spacing schemes.

FIG. 3C shows the normalized throughput obtained using each of the three above-mentioned spacing methods.

Generally, the performance of each of the spacing methods is somewhat similar, with some poor results for particular combinations of buffer size and spacing method (e.g., for an 8 MB buffer with 17 thresholds, geometric spacing underperforms both equidistant and arithmetic spacing).

For equidistant spacing, the underflow and overflow thresholds may first be determined. For example, the underflow threshold may be set as 5% of the buffer capacity, and the overflow threshold may be set as 95% of the buffer capacity.

The number of intermediate watermarks N may be chosen (e.g., selected or predetermined), with $N \geq 1$. More typically, the number of intermediate watermarks is greater than one, for smoother traffic (see, e.g., FIG. 7 and the related discussion, below). Denoting the threshold for the underflow watermark as $W_u$, the threshold for the overflow watermark as $W_o$, the thresholds $W_i$ for each of the intermediate watermarks i=1 through i=N are then given by:

$$W_i = W_U = i \times \frac{W_O - W_U}{N + 1} \qquad \text{Equation (1)}$$

Transmission Smoothing

Whenever a threshold $W_i$ is crossed, a new server sending rate may be calculated, and a rate adjustment (or equivalently, a new server sending rate) may be sent to the server. For example, when the RTSP protocol is used, the information may be sent to the server using an RTSP feedback command. The action taken may depend on which threshold has been crossed. For example, if the $W_o$ or $W_u$ thresholds are crossed, more aggressive action may be taken than if one of the intermediate thresholds $W_i$ is crossed. Similarly, if the warning thresholds $W_1$ or $W_N$ are crossed, the action taken may be more aggressive than if a different intermediate threshold $W_i$ had been crossed, but may be less aggressive than if $W_o$ or $W_u$ had been crossed.

For example, if the $W_o$ threshold is exceeded, the server may be paused (i.e., the sending rate may be set to zero), or its sending rate substantially decreased. The server may remain paused until the buffer level crosses a particular threshold or a particular value (e.g., the N/2 threshold, or the mid-point of the buffer capacity).

Similarly, if the buffer $W_u$ threshold is crossed, the server sending rate may be increased substantially; for example, it may be increased to about one and a half times the average server sending rate until the buffer level reaches a particular value or threshold. When the intermediate thresholds are crossed, new server sending information may be determined by choosing particular rate change amounts or by calculating new server sending information as described below.

In a simple system, the rate change amounts may be predetermined. For example, in an implementation with five intermediate thresholds $W_1$–$W_5$, the interval between packets may be set to 20% less than a default interval for $W_1$, to 10% less than a default interval for $W_2$, to the default interval for $W_3$, to 10% greater than the default interval for $W_4$, and for 20% greater than the default interval for $W_5$.

Figure 4:
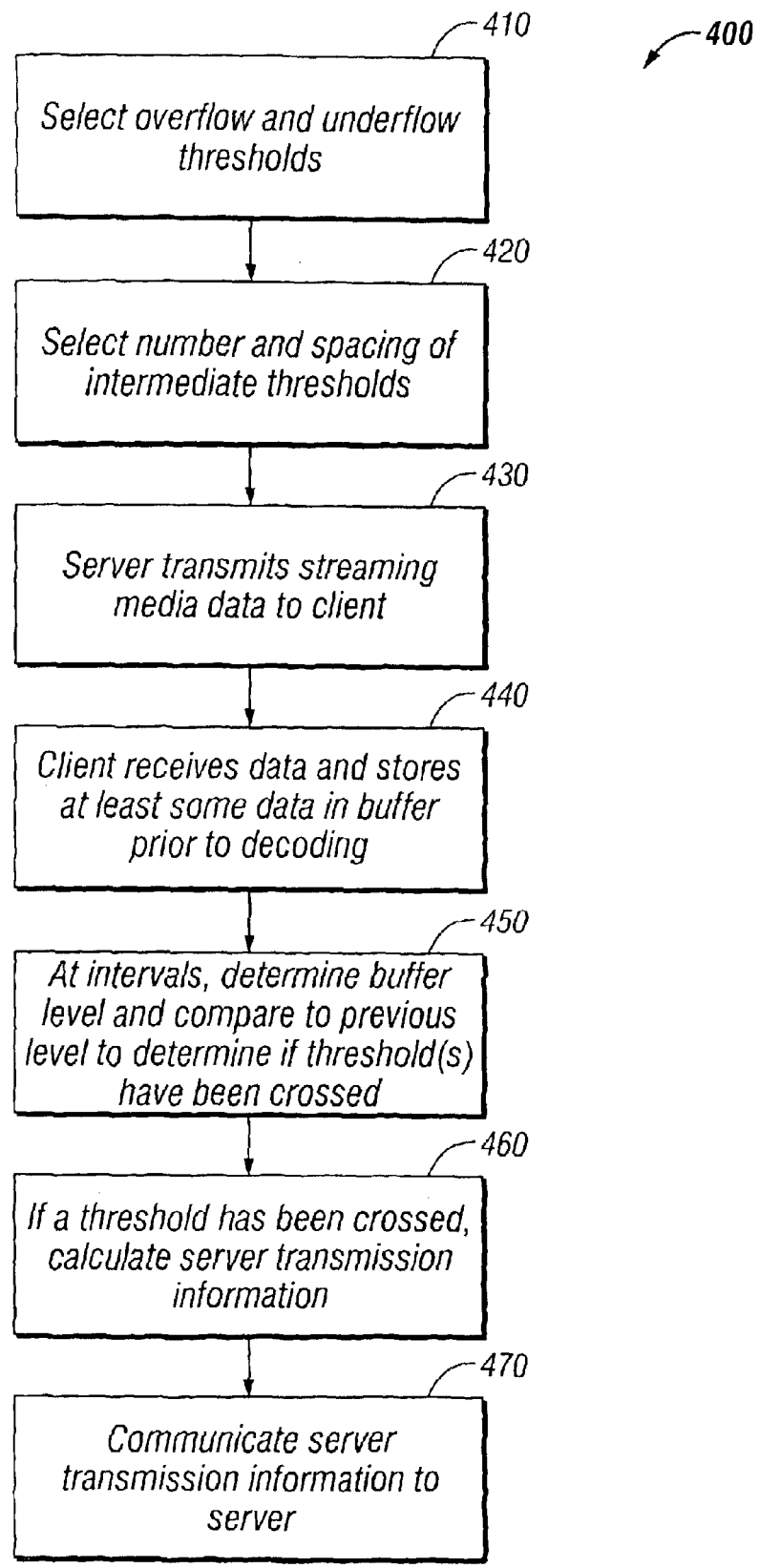
FIG. 4 shows process steps for implementing multi-threshold smoothing.

Referring to FIG. 4, method steps 400 for implementing multi-threshold transmission smoothing are shown. Overflow and underflow thresholds may be chosen (410). The number and spacing of intermediate watermarks may be selected (420). The spacing may be selected according to one of the spacing schemes described above, or may be set in a different way (e.g., chosen).

In operation, the server transmits streaming media data to a client at a server transmission rate (430). The client receives the streaming media data and stores at least some of the data in a buffer prior to decoding (440). At intervals, the buffer level is determined and compared to the previous buffer level to determine whether one or more thresholds has been crossed (450). If a threshold has been crossed, server transmission information (e.g., a new server transmission rate and/or a rate change) is calculated (460), and if it is different from the previous server transmission rate, the server transmission information is communicated to the server (470). Note that the method steps of FIG. 4 need not be performed in the order given.

Techniques to provide data transmission smoothing may use a number of different components and variables. Table 1 includes a list of the parameters used herein.

TABLE 1

| TERM | DEFINITION |
|---|---|
| B | Buffer size |
| N | Number of intermediate threshold levels |
| $W_i$ | i-th intermediate threshold level |
| $W_O$ | Overflow threshold level |
| $W_U$ | Underflow threshold level |
| $W_R$ | Resume threshold (e.g., B/2) |
| $b_t$ | Buffer target level (e.g., B/2) |
| $\Delta t_{obs}$ | Sampling interval |
| $t_{obs}$ (i) | i-th observation point |
| $t_{ctrl}$ (i) | i-th control point |
| $w_{obs}$ | Observation window size; i.e., the number of observation points |
| S | Observed server transmission rate window, <s1, s2, . . . , $s_{wobs}$> |
| $s_i$ | i-th latest observed server transmission rate |
| $s_{wobs}$ | Latest observed server transmission rate |
| R | Observed client consumption rate window, <$r_1, r_2, \ldots, r_{wobs}$> |
| $r_i$ | i-th latest observed client consumption rate |
| $r_{wobs}$ | Latest observed client consumption rate |
| $B_{obs}$ | Observed client buffer status window, <$b_1, b_2, \ldots b_{wobs}$> |
| $b_i$ | i-th latest observed client buffer status |
| $b_{wobs}$ | Latest observed client buffer status |
| $w_{pred}$ | Prediction window size; i.e., the number of predicted points |
| $\hat{R}$ | Predicted client consumption rate window, <$\hat{r}_1, \hat{r}_2, \ldots, \hat{r}_{wpred}$> |
| $\hat{r}_i$ | i-th predicted future client consumption rate (consumption rate at time $t_{obs}$ ($w_{obs}$) + $\Delta t_{obs} \times w_{pred}$) |
| $\hat{r}_{wpred}$ | The furthest predicted future client consumption rate |
| $T_{correct}$ | Expected duration $w_{pred} \times t_{obs}$ to recover the current buffer status to $b_t$ |
| $s_{new}$ | Computed new server transmission rate |
| $w_{fcd}$ | Observation feedback control delay window size |
| SCR[i] | i-th latest smoothed consumption rate |
| $\hat{r}$ | Predicted client consumption rate |
| $\alpha_{cr}$ | Client consumption rate predict parameter |
| $r_t$ | Observed client consumption rate at time t |
| $\hat{r}_t$ | Predicted client consumption rate at time t |
| $\Delta r$ | Rate changes |
| C | Amount of data consumed during the prediction window |
| $d_{feedback}$ | Feedback control delay |

Rate Change Computation

In order to determine an amount by which the server sending rate may be adjusted, the server sending rate, the decoder consumption rate, and the buffer level may be sampled at time intervals equal to $\Delta t_{obs}$. If the observed buffer level $b_{obs}$ crosses any of the thresholds $W_i$, a new server sending rate is computed using Equation (2A) below, and the related rate change $\Delta r$ is shown in Equation (2B).

$$s_{new} = \frac{(b_t - b_{wobs} + C) - (s_{wobs} \times d_{feedback})}{(w_{pred} \times \Delta t_{obs}) - d_{feedback}} \quad \text{Equation (2A)}$$

$$\Delta r = 1 - \frac{s_{new}}{s_{wobs}} \quad \text{Equation (2B)}$$

Equation (3) below shows how C is related to the predicted future consumption rates $\hat{r}_i$. (the prediction of future consumption rates is discussed more fully below):

$$C = \sum_{i=1}^{w_{pred}} (\hat{r}_i \times \Delta t_{obs}) \quad \text{Equation (3)}$$

When crossing the thresholds $W_1$ and $W_N$, the computed rate change $\Delta r$ may not be sufficient to avoid reaching $W_U$ and $W_o$, respectively, due to the error margin of the prediction algorithms. Although the error margin may be reduced, doing so adds computational complexity that may not be desired in certain situations.

An alternative is to add or subtract a mean absolute percentage error (MAPE) from $\hat{r}_i$, as shown in Equations (4A) and (4B). Equation (4A) shows how an adjusted $\hat{r}_i$ may be calculated when $W_N$ is reached, while Equation (4B) shows how an adjusted $\hat{r}_i$ may be calculated when $W_1$ is reached.

$$\hat{r}_i(\text{adjusted}) = \hat{r}_i \times (1 - MAPE) \quad \text{Equation (4A)}$$

$$\hat{r}_i(\text{adjusted}) = \hat{r}_i \times (1 - MAPE) \quad \text{Equation (4B)}$$

Equation (5) shows how a MAPE value may be computed. In Equation (5), P is the number of prediction samples up to the current prediction time.

$$MAPE = \left(\frac{1}{P}\right) \sum_{t=1}^{P} |r_t - \hat{r}_t| \quad \text{Equation (5)}$$

Consumption Rate Prediction

Rather than requiring knowledge of the bit rate of the media stream prior to transmission, the current systems and techniques predict a consumption rate, so that live streams (e.g., streams that are being produced and transmitted as the events they depict-such as a live concert or distance learning session-occur) may be provided to end users.

Consumption rate prediction may observe the $w_{obs}$ most recent rate samples to predict $w_{pred}$ samples into the future. For example, if $w_{obs}$=10 and $w_{pred}$=2, the 10 previous rate samples may be used to predict the rate 2 samples into the future. The observation window R includes $w_{obs}$ previous rate values $<r_1, r_2, \ldots, r_{obs}>$, while prediction window $\hat{R}$ includes the $w_{pred}$ predicted rate values $<\hat{r}_1, \hat{r}_2, \ldots, \hat{r}_{wpred}>$. The estimated future rate is denoted $\hat{r}$.

Prediction algorithms may be based on a number of different schemes. For example, an average consumption rate algorithm may be used, an exponential average algorithm may be used, or a fuzzy exponential average algorithm may be used.

An average consumption rate algorithm may predict the average consumption rate of the prediction window $\hat{R}$ using an average consumption rate of the observation window R, according to Equation (6):

$$\hat{r} = \left(\frac{1}{w_{obs}}\right) \sum_{i=1}^{w_{obs}} r_i \quad \text{Equation (6)}$$

An exponential average consumption rate algorithm may be used to give more weight to some samples in the observation window than to others. A smoothed consumption rate parameter for i=1 is set to $r_1$, while the remainder of the SCR[i] are given by Equation (7) below, where $\alpha_{cr}$ is a weighting parameter.

$$SCR[i] = \alpha_{cr} \times SCR[i-1] + (1-\alpha_{cr}) \times r_i - 1 \quad \text{Equation (7)}$$

The estimated future rate is then given by Equation (8) below.

$$\hat{r} = SCR[w_{obs} + 1] \quad \text{Equation (8)}$$

There are two variations in applying this algorithm to forecast the future consumption rates during the prediction window $\hat{R}$. The first variation, which will be referred to as the "expanding window exponential average algorithm," predicts $\hat{r}_i$ based on an increasing window $<\hat{R}, \hat{r}_1, \hat{r}_2, \ldots, \hat{r}_{i-1}>$ using Equation (8). The expanding window exponential average algorithm increases the window size by one sample each time a new $\hat{r}_i$ is generated. The second variation, which will be referred to as the "sliding window exponential average algorithm," keeps the window size constant and slides the observation window R forward when a new $\hat{r}_i$ is generated.

A fuzzy exponential average consumption rate algorithm may be used to generate the $\hat{r}_i$ by combining a fuzzy logic controller with the window exponential average algorithm. Using the fuzzy exponential average algorithm, the parameter $\alpha_{cr}$ is dynamically calculated.

The parameter $\alpha_{cr}$ controls the weight given to different samples. When $\alpha_{cr}$ is large, more weight is given to past samples. When $\alpha_{cr}$ is small, more weight is given to the more recent samples. Therefore, if the variability in the consumption rate in the system is small (i.e., the bit rate of the stream is fairly constant), the prediction error should be small, and a large $\alpha_{cr}$ may be used. On the other hand, if the variability is large (e.g., the stream is bursty), a small $\alpha_{cr}$ is appropriate, so that more recent sample data is weighted more heavily.

Figure 5:
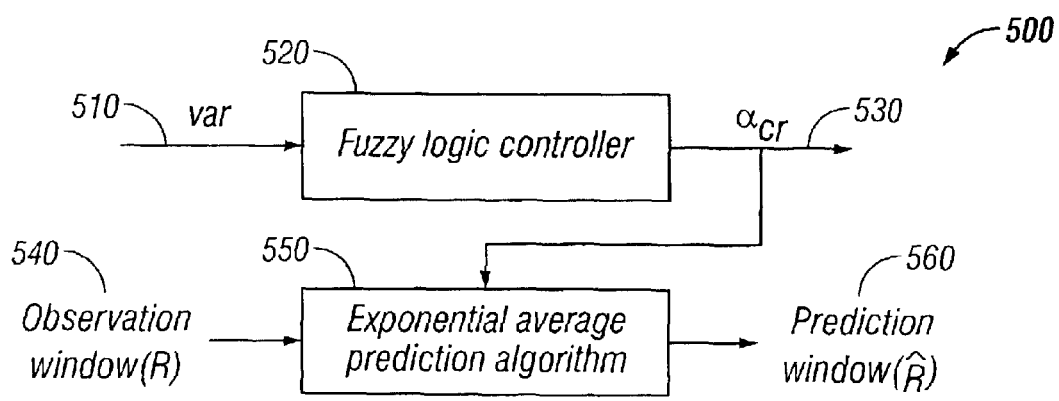
FIG. 5 is a schematic of a fuzzy exponential average algorithm.

Referring to FIG. 5, a schematic 500 of the fuzzy exponential average algorithm is shown. Variability information 510 is provided to a fuzzy logic controller 520. Fuzzy logic controller 520 produces weighting factor $\alpha_{cr}$ 530 based on the variability information. The value for $\alpha_{cr}$ 530 and observation window information 540 is provided to the exponential average prediction algorithm 550, which outputs the prediction window information 560.

The variability of a stream may be characterized by a normalized variance var, calculated according to Equation (9) below.

$$\text{var} = \min\left(1, \frac{\left|r_{obs} - \frac{\sum_{i=1}^{w_{obs}} r_i}{w_{obs}}\right|}{\frac{\sum_{i=1}^{w_{obs}} r_i}{w_{obs}}}\right) \quad \text{Equation (9)}$$

Figure 6A:
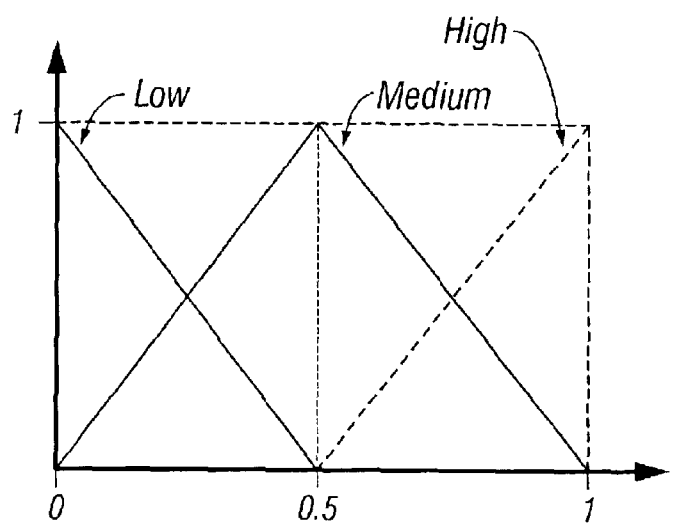
FIGS. 6A and 6B illustrate membership functions for the variables var and $\alpha_{cr}$.
Figure 6B:
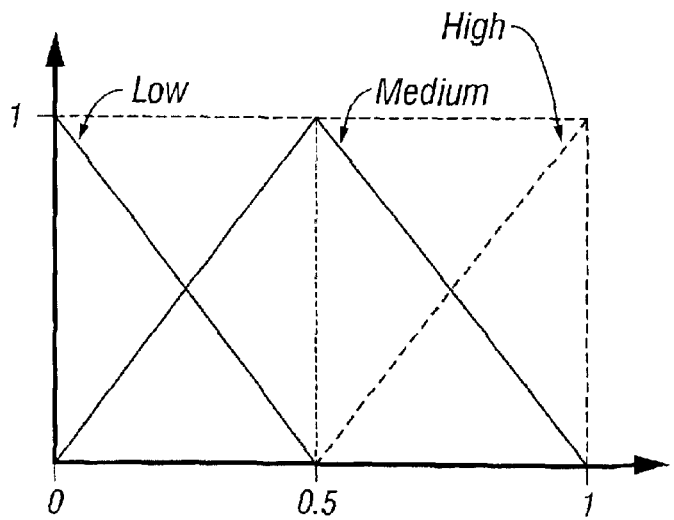

Referring to FIGS. 6A and 6B, membership functions for the variable var (FIG. 6A) and the variable $\alpha_{cr}$ (FIG. 6B) are shown. The following fuzzy control rules may be applied to the low, medium, and high regions of var data and $\alpha_{cr}$ data. If var is low, then $\alpha_{cr}$ is high. If var is high, then $\alpha_{cr}$ is low. If var is medium, then $\alpha_{cr}$ is medium. Of course, more complicated schemes may be used.

Feedback Message Delay

The round-trip feedback message delay ($d_{feedback}$) is an important factor in the transmission rate smoothing. The delay may be configured to be a conservatively estimated constant delay, or may be based on one or more measurements. The delay may be estimated dynamically, based on a prediction algorithm, to more closely reflect the transmission delay in the network.

Figure 7:
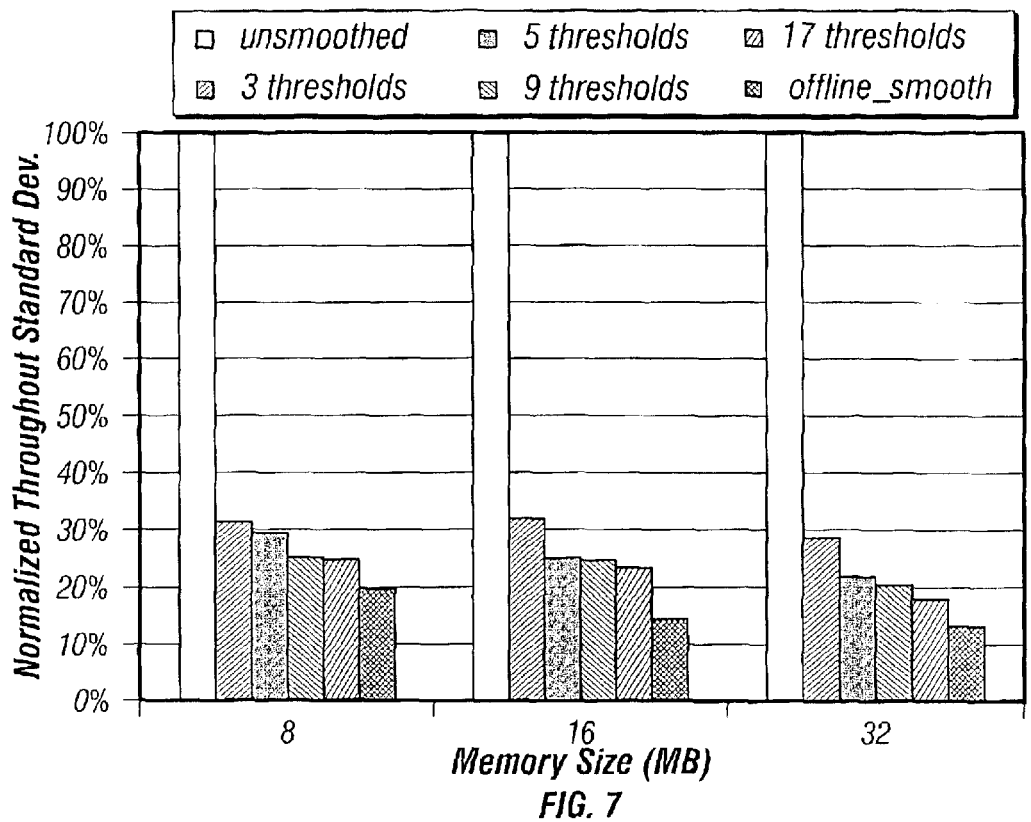
FIG. 7 shows the dependence of normalized throughput on the number of thresholds, for three buffer sizes.

The systems and techniques described herein can provide a number of benefits for streaming media data. Referring to FIG. 7, the normalized throughput standard deviation is shown for transmission of media data for the movie Twister, using a prediction window size of 90 seconds, three different buffer sizes (8, 16, and 32 MB), and for six different transmission methods. In the first (bar to the far right), complete rate information about the bit rate is known. In the second through fifth, MTFC was implemented with different numbers of intermediate thresholds. In the last, no smoothing was implemented.

As FIG. 7 demonstrates, using MTFC according to the current systems and techniques provides a significant benefit over unsmoothed transition of streaming data, with larger numbers of thresholds generally corresponding to smoother traffic. Additionally, FIG. 7 also demonstrates that providing a larger buffer provides for smoother traffic.

Figure 8A:
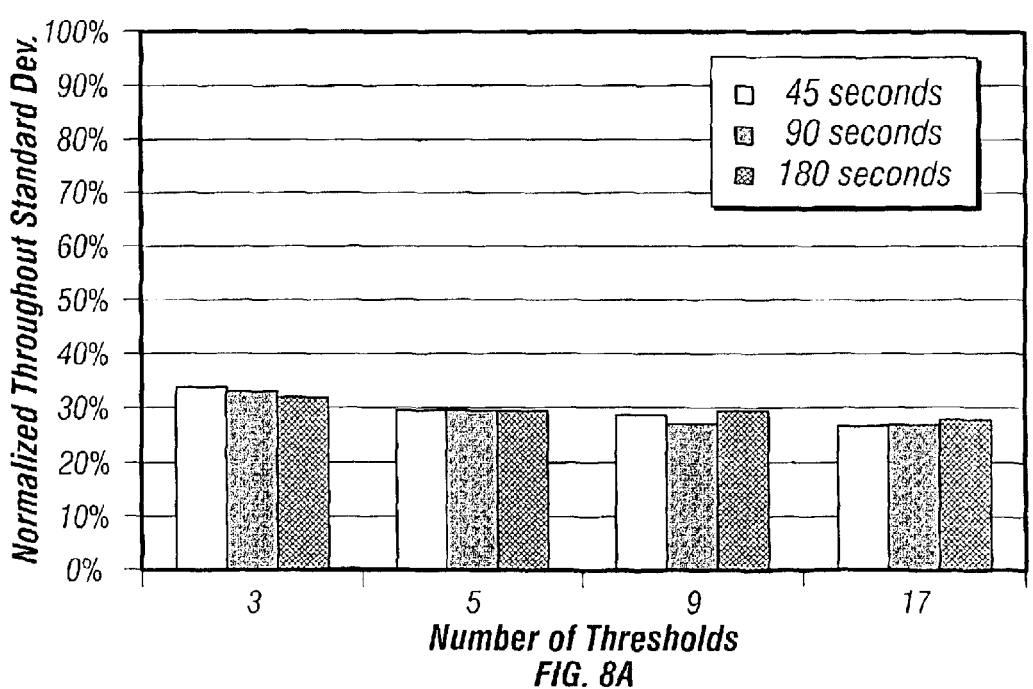
FIGS. 8A to 8C show the dependence of normalized throughput on the size of the prediction window, for three buffer sizes.
Figure 8B:
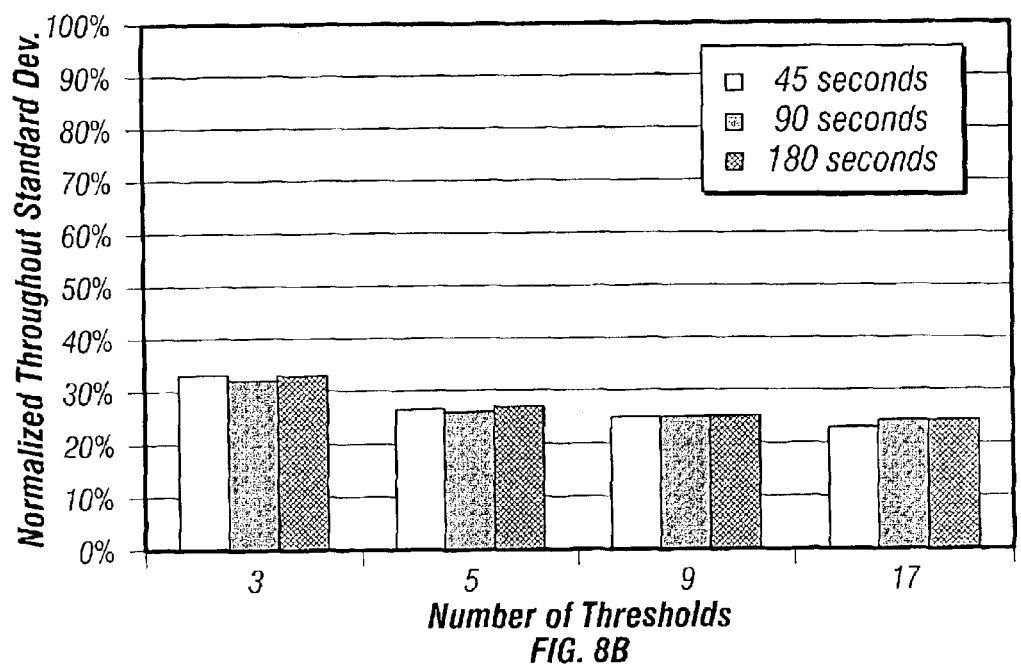
Figure 8C:
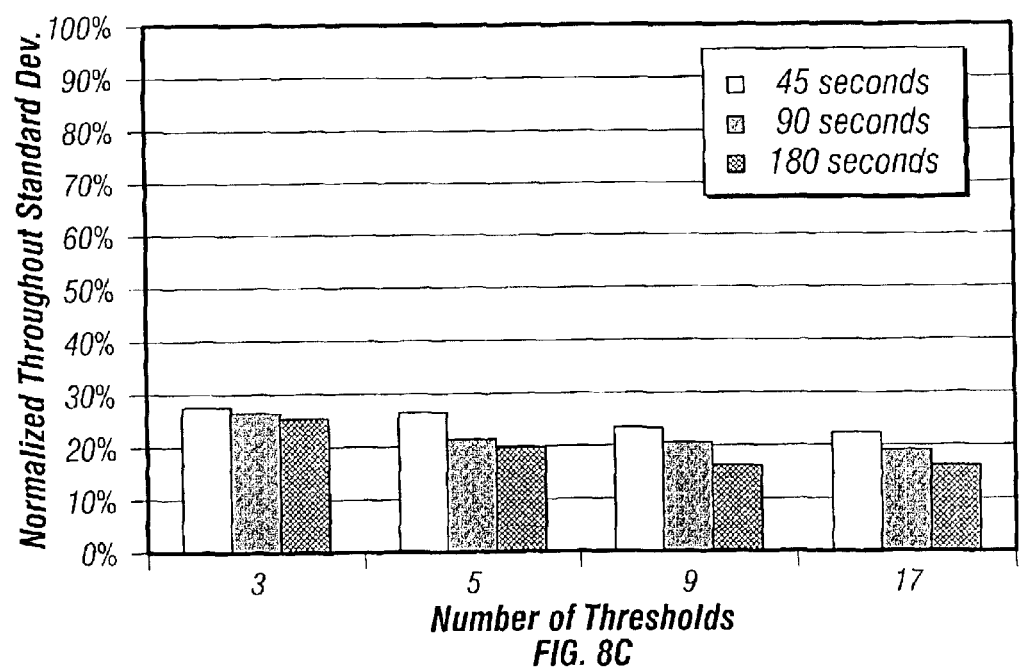

FIGS. 8A through 8C show the effect of varying the prediction window, for buffer sizes of 8 MB, 16 MB, and 32 MB, and for various numbers of intermediate thresholds. In FIGS. 8A–8C, larger prediction windows provide smoother traffic for larger buffer sizes, but not for smaller buffer sizes. This may be due to the fact that, for the same number of thresholds, the change in buffer level that triggers a change in server sending rate is much smaller (e.g., for a set number of thresholds, the "distance" between the thresholds in an 8 MB buffer is about ¼ of the distance between the thresholds in a 32 MB buffer). Therefore, with a larger buffer (with more distance between thresholds) there may be longer segments at a constant rate than with a smaller buffer having the same number of thresholds.

Feedback messages from the client to the server introduce overhead. In order to reduce consumption of network resources for control purposes, the overhead may be reduced by reducing the number of rate changes. However, there may be a trade-off between the number of rate changes and the smoothness of the traffic.

Figure 9:
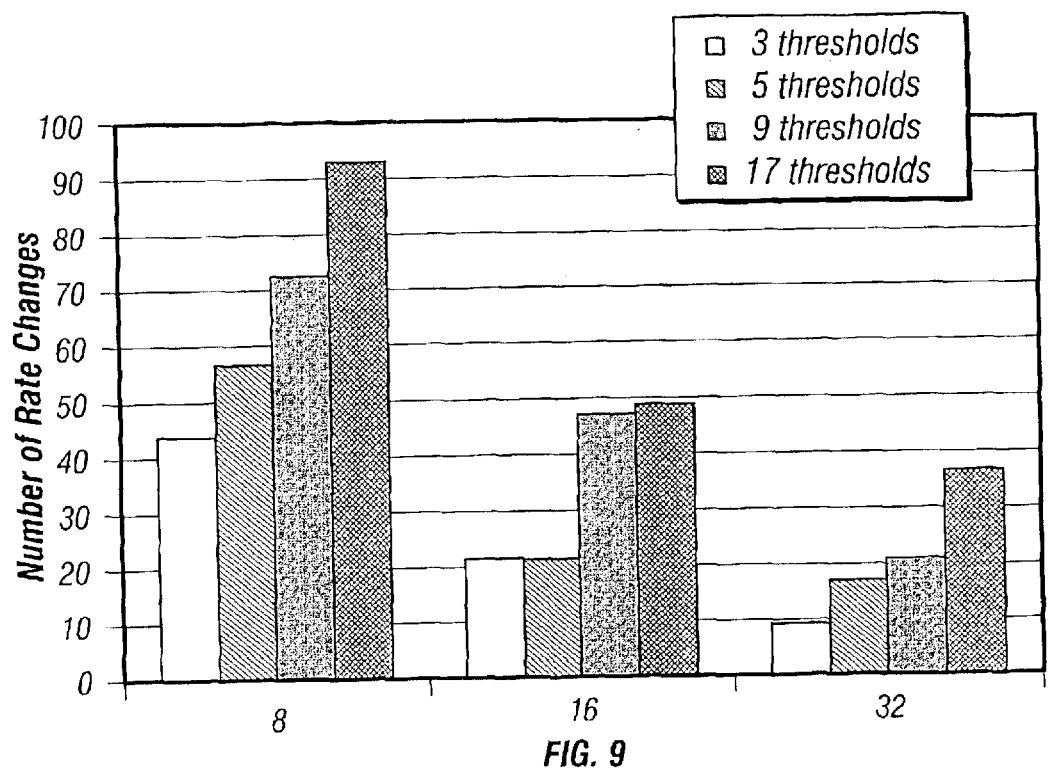
FIG. 9 shows the number of rate changes for different threshold numbers and for three buffer sizes.
Figure 10A:
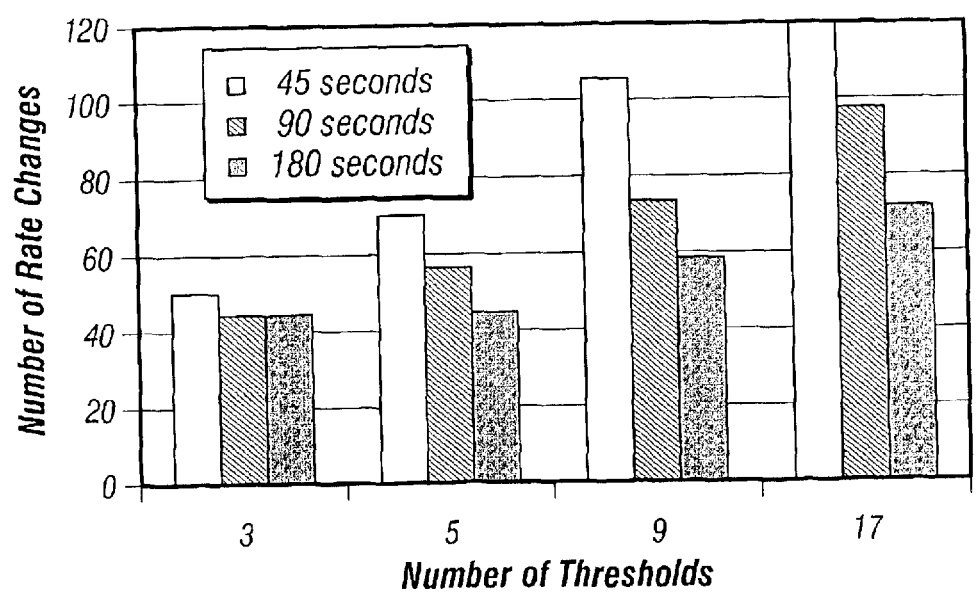
FIGS. 10A through 10C show the number of rate changes for different prediction window sizes, and for three buffer sizes.
Figure 10B:
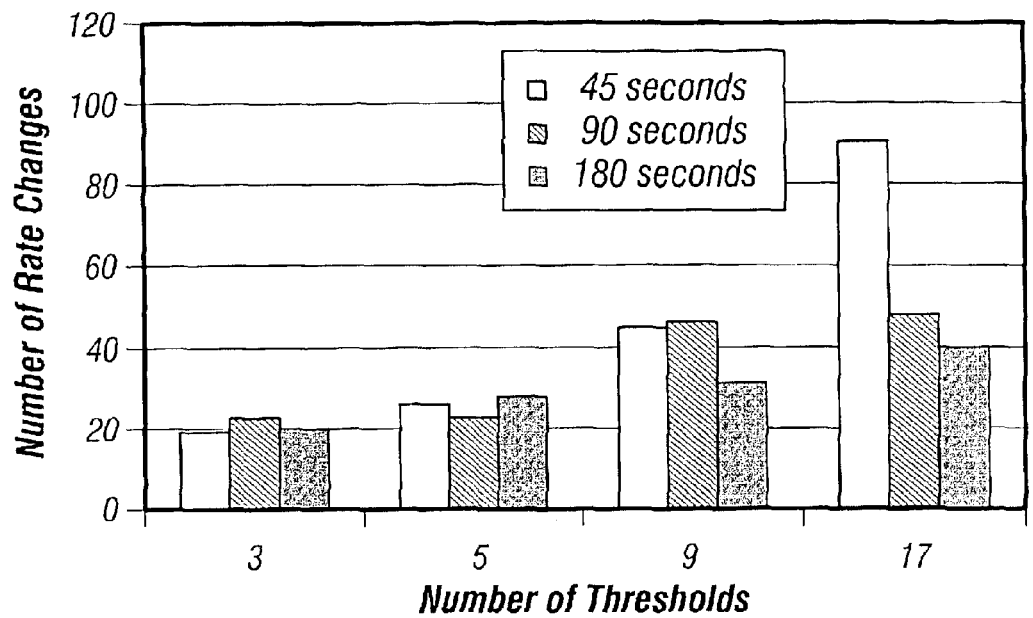
Figure 10C:
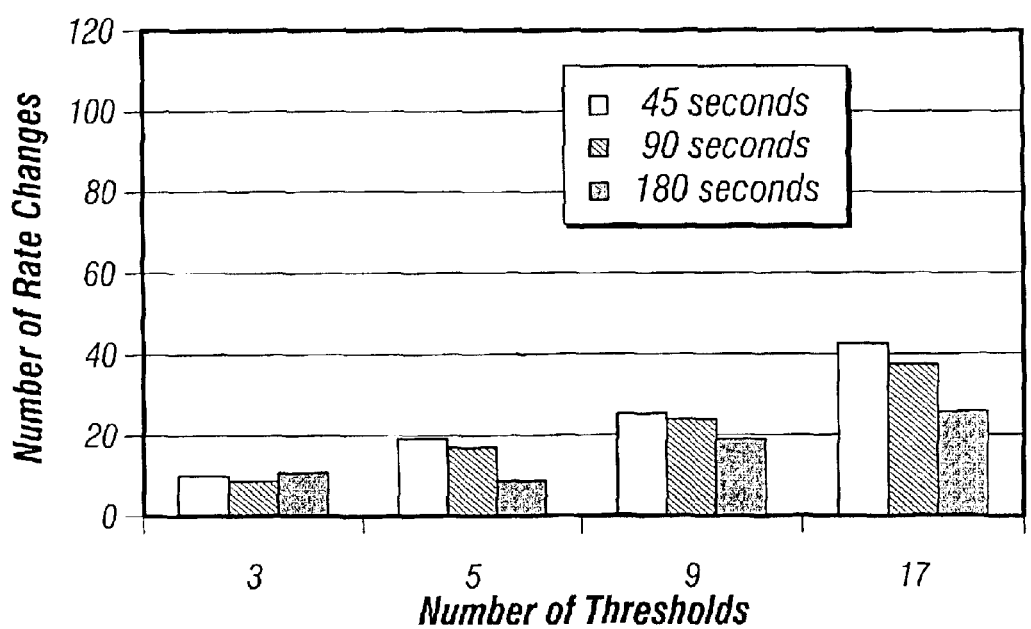

Referring to FIG. 9, an increase in the number of thresholds for a particular buffer size increases the number of rate changes (but also may provide for smoother traffic; see, e.g., FIG. 7). Additionally, for the same number of thresholds, larger buffers have fewer rate changes. Referring to FIGS. 10A–10C, a longer prediction window generally results in fewer rate changes.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, configured to receive and/or transmit data and instructions, at least one input device, and at least one output device.

A number of implementations have been described. Nevertheless, it will be understood that various modifications may be made without departing from the spirit and scope of the invention. For example, different buffer sizes, threshold numbers, prediction window sizes, etc. may be used. Accordingly, other embodiments are within the scope of the following claims.

What is claimed is:

1. A method, comprising:
   receiving streaming media data from a server, the server transmitting the data at a first server transmission rate;
   storing at least some of the streaming media data in a buffer;
   determining a first buffer level of the buffer;
   subsequently determining a second buffer level of the buffer;
   comparing the first buffer level and the second buffer level to a plurality of buffer thresholds, the plurality of buffer thresholds including an underflow threshold, an overflow threshold, and a plurality of intermediate thresholds;
   determining whether at least one of the plurality of buffer thresholds is in a range from the first buffer level to the second buffer level; and
   if at least one of the plurality of buffer thresholds is in the range from the first buffer level to the second buffer level, determining a second server transmission rate based on the at least one buffer threshold.

2. The method of claim 1, further comprising transmitting server transmission information based on the second server transmission rate to the server.

3. The method of claim 2, wherein the server transmission information is chosen from the second server transmission rate and the difference between the first server transmission rate and the second server transmission rate.

4. The method of claim 1, further comprising transmitting the second server transmission rate to the server if the second server transmission rate is different than the first server transmission rate.

5. The method of claim 1, wherein determining a second server transmission rate based on the buffer threshold comprises determining a difference between the second buffer level and a target buffer level.

6. The method of claim 1, wherein determining a second server transmission rate based on the buffer threshold comprises predicting one or more future consumption rates.

7. The method of claim 1, wherein determining a second server transmission rate based on the buffer threshold comprises using a first calculation method to determine the second server transmission rate if the underflow threshold or the overflow threshold is not in the range from the first buffer level to the second buffer level.

8. The method of claim 7, wherein determining a second server transmission rate based on the buffer threshold comprises using a second calculation method to determine the second server transmission rate if the underflow threshold or the overflow threshold is in the range from the first buffer level and the second buffer level.

9. The method of claim 8, wherein determining a second server transmission rate based on the buffer threshold comprises predicting a consumption rate at a first time subsequent to a current time.

10. The method of claim 9, wherein predicting a consumption rate at a first time subsequent to a current time comprises using a consumption rate at a second time previous to the current time to predict the consumption rate at the first time.

11. The method of claim 10, wherein predicting a consumption rate at a first time subsequent to a current time comprises predicting the consumption rate using a prediction algorithm.

12. The method of claim 11, wherein the prediction algorithm is chosen from the group consisting of an average consumption rate algorithm, an exponential average consumption rate algorithm, and a fuzzy exponential average algorithm.

13. The method of claim 12, wherein the prediction algorithm is chosen from the group consisting of an exponential average consumption rate algorithm and a fuzzy exponential average algorithm, and wherein the prediction algorithm includes determining a smoothed consumption rate parameter based on one or more weighting factors.

14. The method of claim 13, wherein the prediction algorithm is a fuzzy exponential average algorithm, and at least one of the one or more weighting factor is based on a variability of the streaming media data.

15. A method, comprising:
  transmitting continuous media data to a client machine at a first transmission rate;
  receiving a communication from the client machine, the communication including rate change information determined by the client; and
  transmitting additional continuous media data to the client machine at a second transmission rate based on the rate change information, wherein the rate change information determined by the client is determined according to a method comprising:
  determining a first buffer level of a client buffer;
  subsequently determining a second buffer level of the client buffer;
  comparing the first buffer level and the second buffer level to a plurality of buffer thresholds, the plurality of buffer thresholds including an underflow threshold, an overflow threshold, and a plurality of intermediate thresholds; and
  determining whether at least one of the plurality of buffer thresholds is in a range from the first buffer level to the second buffer level, and if at least one of the plurality of buffer thresholds is in the range from the first buffer level to the second buffer level, determining a second server transmission rate based on the buffer threshold.

16. An article comprising a machine-readable medium storing instructions operable to cause one or more machines to perform operations comprising:
  receiving streaming media data from a server, the server transmitting the data at a first server transmission rate;
  storing at least some of the streaming media data in a buffer;
  determining a first buffer level of the buffer;
  subsequently determining a second buffer level of the buffer;
  comparing the first buffer level and the second buffer level to a plurality of buffer thresholds, the plurality of buffer thresholds including an underflow threshold, an overflow threshold, and a plurality of intermediate thresholds;
  determining whether at least one of the plurality of buffer thresholds is in a range from the first buffer level to the second buffer level; and
  if at least one of the plurality of buffer thresholds is in the range from the first buffer level to the second buffer level, determining a second server transmission rate based on the buffer threshold.

17. A system, comprising:
  means for receiving streaming media data from a server, the server transmitting the data at a first server transmission rate;
  means for storing at least some of the streaming media data in a buffer;
  means for determining a first buffer level of the buffer;
  means for subsequently determining a second buffer level of the buffer;
  means for comparing the first buffer level and the second buffer level to a plurality of buffer thresholds, the plurality of buffer thresholds including an underflow threshold, an overflow threshold, and a plurality of intermediate thresholds;
  means for determining whether at least one of the plurality of buffer thresholds is in a range from the first buffer level to the second buffer level; and
  means for determining a second server transmission rate based on a buffer threshold in the range from the first buffer level to the second buffer level.

18. The system of claim 17, further comprising means for predicting a future consumption rate based on one or more prior consumption rates.

19. The system of claim 17, further comprising means for communicating server transmission information to the server.

20. The system of claim 17, further comprising means for storing the plurality of buffer thresholds.

* * * * *